(12) United States Patent
Bengtsson et al.

(10) Patent No.: US 12,375,161 B2
(45) Date of Patent: Jul. 29, 2025

(54) RE-CONFIGURABLE REPEATER DEVICE INCLUDING BEAM-SHAPING UNIT

(71) Applicant: Sony Group Corporation, Tokyo (JP)

(72) Inventors: Erik Bengtsson, Eslöv (SE); Kun Zhao, Malmö (SE); Jose Flordelis, Lund (SE); Olof Zander, Södra Sandby (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 183 days.

(21) Appl. No.: 18/036,328

(22) PCT Filed: Nov. 29, 2021

(86) PCT No.: PCT/EP2021/083353
§ 371 (c)(1),
(2) Date: May 10, 2023

(87) PCT Pub. No.: WO2022/112553
PCT Pub. Date: Jun. 2, 2022

(65) Prior Publication Data
US 2024/0014884 A1    Jan. 11, 2024

(30) Foreign Application Priority Data
Nov. 30, 2020    (SE) .................................. 2051396-6

(51) Int. Cl.
*H04B 7/00*    (2006.01)
*H04B 7/155*    (2006.01)

(52) U.S. Cl.
CPC .............................. *H04B 7/15528* (2013.01)

(58) Field of Classification Search
CPC ........................ H04B 7/15528; H04B 7/04013
See application file for complete search history.

(56) References Cited

U.S. PATENT DOCUMENTS

| 6,934,511 B1 | 8/2005 | Lovinggood |
| 10,116,058 B2 | 10/2018 | Oh |
| 10,594,033 B1 | 3/2020 | Black |
| 2018/0302802 A1* | 10/2018 | Fanfelle ................. H01Q 21/24 |

(Continued)

FOREIGN PATENT DOCUMENTS

| CN | 105428819 A | 3/2016 |
| CN | 106450789 A | 2/2017 |

(Continued)

OTHER PUBLICATIONS

International Search Report from corresponding International Application No. PCT/EP2021/083353, mailed on Apr. 7, 2022, 3 pages.

(Continued)

*Primary Examiner* — Hashim S Bhatti
(74) *Attorney, Agent, or Firm* — Tucker Ellis LLP

(57) ABSTRACT

A re-configurable repeater device—such as a large intelligent surface or an amplify-and-forward repeater—includes an array of reflective elements and a beam-shaping unit in front of the array. The beam-shaping unit is configured to increase a beam diameter of an incoming beam. For instance, the divergence of incoming electromagnetic waves can be increased. It would be possible that the beam-shaping unit is im-plemented as a lens, e.g., a Luneberger-type lens.

13 Claims, 7 Drawing Sheets

(56) References Cited

U.S. PATENT DOCUMENTS

2019/0319355 A1* 10/2019 Ko .................. H01Q 15/10
2019/0319363 A1   10/2019 Ko
2020/0322037 A1* 10/2020 Abedini ............ H04W 52/245
2020/0336168 A1* 10/2020 Hormis .................. H03L 7/22

FOREIGN PATENT DOCUMENTS

EP     3300172 A1    3/2018
WO  2018096306 A1    5/2018

OTHER PUBLICATIONS

A. Sayeed et al., "A Lens Array Multi-beam MIMO Testbed for 11-15 Real-Time mmWave Communication and Sensing", mmNets'17: Proceedings of the 1st ACM Workshop on Millimeter-Wave Networks and Sensing Systems, Oct. 16, 2017, 6 pages.

R. Foster et al., "Beam-Steering Performance of Flat Luneburg Lens at 60 GHz for Future Wireless Communications", International Journal of Antennas and Propagation, vol. 2017, Article ID 7932434, published Aug. 2, 2017, 9 pages.

R. W. Heath et al., "An Overview of Signal Processing Techniques for Millimeter Wave MIMO Systems", IEEE Journal of Selected Topics in Signal Processing, vol. 10, No. 3, Apr. 2016, 18 pages.

S. Gong et al., "Toward Smart Wireless Communications via Intelligent Reflecting Surfaces: A Contemporary Survey", IEEE Communications Surveys & Tutorials, vol. 22, No. 4, Fourth Quarter 2020, 32 pages.

S. Manafi et al., "Design of a Perforated Flat Luneburg Lens Antenna Array for Wideband Millimeter-Wave Applications", 13th European Conference on Antennas and Propagation (EuCAP), dated 2019, 5 pages.

S. V. Hum et al., "Reconfigurable Reflectarrays and Array Lenses for Dynamic Antenna Beam Control: A Review", IEEE Transactions on Antennas and Propagation, vol. 62, No. 1, Jan. 2014, 16 pages.

Y. J. Cho et al., "RF Lens-Embedded Antenna Array for mmWave MIMO: Design and Performance", IEEE Communications Magazine, vol. 56, Jul. 2018, 7 pages.

Office Action and Search Report from corresponding Swedish Application No. 2051396-6; dated Jul. 16, 2021, 8 pages.

Sha Hu et al.: "Beyond Massive MIMO: The Potential of Data Transmission With Large Intelligent Surfaces"; I IEEE Transactions on Signal Processing, vol. 66, No. 10, May 15, 2018; 13 pages.

* cited by examiner

RE-CONFIGURABLE REPEATER DEVICE INCLUDING BEAM-SHAPING UNIT

TECHNICAL FIELD

Various examples generally relate to a re-configurable repeater device (RRD) that is re-configurable to provide multiple spatial filters that are applied to an incoming beam, to thereby obtain an outgoing beam. Various examples generally relate to an RRD that includes a beam-shaping unit that is configured to increase a beam diameter of the incoming beam.

BACKGROUND

To increase a coverage area for wireless communication, it is envisioned that RRDs will become commonplace. Different kinds of RRDs are known.

A first kind of RRD is a re-configurable repeater device, sometimes also referred to as a reflecting large intelligent surface (LIS). See, e.g., Sha Hu, Fredrik Rusek, and Ove Edfors. "Beyond massive MIMO: The potential of data transmission with large intelligent surfaces." *IEEE Transactions on Signal Processing* 66.10 (2018): 2746-2758. An LIS can be implemented by an array of antennas that reflect incoming electromagnetic waves/signals or a meta-surface. The array of antennas can be semi-passive. Semi-passive can correspond to a scenario in which the antennas do not provide signal amplification but can impose a variable phase shift and/or attenuation. An input spatial direction from which incident signals (incident onto the RRD) on a data carrier are accepted and an output spatial direction into which the incident signals are reflected can be re-configured, by changing a phase relationship and/or attenuation relationship between the antennas.

A second kind of RRD is a so-called smart repeater having an amplify-and-forward functionality, i.e., beyond changing phase relationship, the amplitude relationship can be changed between antennas. Amplify-and-forward functionality is different to a decode-and-forward functionality in that it is not required to translate RF signals into the baseband and decode. This simplifies the hardware design of smart repeaters when compared to decode-and-forward relays. On the other hand, noise imposed on the signal is also amplified and forwarded.

In general, RRDs of various sizes are foreseen as tools to enhance the radiation properties of spatial propagation channels, from the perspective of both coverage enhancement and mitigation of shadowing. The RRD should ensure a strong propagation channel (i.e., low path loss) via a controlled reflection and optionally amplification, by having the capability of tracking a moving user and re-configuring re-configurable elements accordingly.

In general, at higher frequencies of electromagnetic waves, diffraction of the electromagnetic waves is less pronounced, which thereby leads to sharper shadows. RRDs are, therefore, foreseen to play a larger role at frequencies in the mm-wave and THz regime.

SUMMARY

Accordingly, there is a need for RRDs which provide reliable and accurate spatial filtering, in particular at frequencies in the mm-wave and THz regime.

This need is met by the features of the independent claims. The features of the dependent claims defined embodiments.

The techniques described herein enable an increase to the area illuminated on a reflective surface of the RRD (effective aperture). In particular, it is possible to increase a beam diameter of an incoming beam. By increasing the effective aperture of the re-configurable repeater device, more accurate beam steering becomes possible. For instance, sidelobes of the outgoing beam can be suppressed. Also, quantization effects can be reduced and far-field approximations can be accurately applied when re-configuring the re-configurable elements of the RRD.

To increase the beam diameter of the incoming beam, a beam-shaping unit is used. The beam-shaping unit is upstream along the incoming beam, i.e., in front of the reflective surface formed by an array of re-configurable elements of the RRD.

An RRD is re-configurable to provide multiple spatial filters. Each one of the multiple spatial filters is applied to an incoming beam. Thereby, an outgoing beam is obtained. The RRD includes an array of re-configurable elements. The re-configurable elements of the array of the re-configurable elements are configured to impose a respective phase shift onto outgoing electromagnetic waves of the outgoing beam with respect to incoming electromagnetic waves of the incoming beam. The RRD also includes a beam-shaping unit. The beam-shaping unit is arranged at an offset from the array of re-configurable elements upstream along a propagation direction of the incoming beam. The beam-shaping unit is configured to increase a beam diameter of the incoming beam.

For example, the RRD can be a LIS or a smart repeater.

The RRD can be implemented by an array of antennas or a meta-material.

The RRD can have a physically defined optical aperture, e.g., defined by a size of a respective reflective surface. The effective optical aperture—i.e., effectively acting on the electromagnetic waves—can be as large as the optical aperture or smaller, depending on the illuminated area.

The illuminated area can depend on the beam diameter. The beam diameter can be associated with a beam width of the incoming beam at a respective transmitter. The beam diameter can further depend on propagation characteristics of the incoming electromagnetic wave such as divergence.

A method of re-configuring an RRD includes re-configuring re-configurable elements arranged in an array. Said re-configuring is based on an incident angle of an incoming beam, an outgoing angle of an outgoing beam, as well as a predefined beam-shaping coefficient that is associated with a beam-shaping unit of the RRD. The beam-shaping unit is offset from the array.

The beam-shaping coefficient can be fixedly stored in a memory. The beam-shaping coefficient could be calculated, e.g., depending on the incident angle and/or the outgoing angle.

The beam-shaping coefficient can describe an optical impact of the beam-shaping unit onto the electromagnetic waves traversing the optical aperture of the beam-shaping unit.

The optical effect of the beam-shaping unit can be to increase the beam diameter, e.g., by increasing a beam divergence of incoming electromagnetic waves of the incoming beam incident onto the beam-shaping unit.

By considering the predefined beam-shaping coefficient when re-configuring the re-configurable elements, it is possible to accurately set the outgoing angle so that a low path loss is achieved between a transmitter of the incoming beam and a receiver of the outgoing beam.

A computer program or a computer-program product or a computer-readable storage medium includes program code that can be loaded and executed by at least one processor. Upon loading and executing the program code, the at least one processor is configured to perform a method of re-configuring an RRD. The method includes re-configuring re-configurable elements arranged in an array. Said re-configuring is based on an incident angle of an incoming beam, an outgoing angle of an outgoing beam, as well as a predefined beam-shaping coefficient that is associated with a beam-shaping unit of the RRD. The beam-shaping unit is offset from the array.

A device includes a control circuitry configured to re-configure re-configurable elements of an RRD. The re-configurable elements are arranged in an array. Said re-configuring is based on an incident angle of an incoming beam, and outgoing angle of an outgoing beam, as well as a predefined beam-shaping coefficient that is associated with the beam-shaping unit of the RRD. The beam-shaping unit is offset from the array.

It is to be understood that the features mentioned above and those yet to be explained below may be used not only in the respective combinations indicated, but also in other combinations or in isolation without departing from the scope of the disclosure.

DETAILED DESCRIPTION OF THE DRAWINGS

Figure 1:
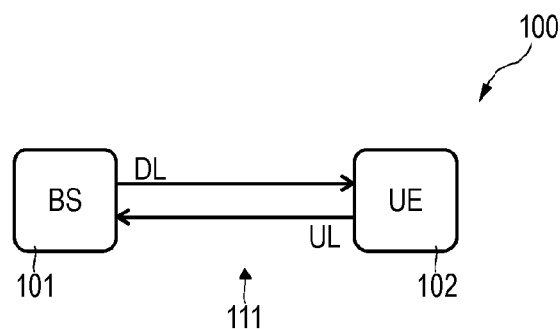
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

According to various examples, two nodes—e.g., a base station (BS) and a wireless communication device (UE) of a cellular communications network—can communicate with each other via an RRD. The RRD includes an array of re-configurable elements, e.g., an antenna array or metamaterial unit cell. The array of re-configurable elements forms a reflective surface. In examples, an RRD may include a reflective antenna array (RAA). The RRD can implement a smart repeater functionality using amplify-and-forward procedures. To forward an incident signal, the RRD may not decode the signal. The RRD may not translate an incident signal into the baseband.

As a general rule, the RRD is re-configurable to provide multiple spatial filters. Thereby, a spatial propagation channel between two nodes—e.g., the BS and the UE—can be diverted. Each one of the multiple spatial filters is associated with at least one respective incident angle from which incoming electromagnetic waves of an incoming beam are accepted, as well as with at least one respective output angle into which outgoing electromagnetic waves of an outgoing beam are reflected and optionally amplified by the RRD. Each output spatial direction is associated with a respective beam. The RRD thereby implements beam steering.

To achieve such spatial filtering, the array of re-configurable elements can be re-configured. In particular, each re-configurable element, or a set of two or more re-configurable elements, is configured to locally impose a respective phase shift onto the outgoing electromagnetic waves of the outgoing beam with respect to the respective incoming electromagnetic waves of the incoming beam. Accordingly, depending on the particular setting of one or more re-configurable elements, different phase shifts can be imposed. Thereby, the beam steering can be implemented, by phase-coherent superposition of these outgoing electromagnetic waves, thereby forming the outgoing beam.

The RRD can be implemented using a metamaterial array of re-configurable elements or an array antenna. For metamaterial-based-arrays, the general principle is that densely spaced sub-wavelength elements form the array of re-configurable elements, to thereby jointly contribute to the reflection properties of the surface. Typically, a length dimension of such metamaterial re-configurable elements is less than half or a quarter of a wavelength of the electromagnetic waves. As the number of re-configurable elements per wavelength of the electromagnetic waves is large, the individual contribution to the phase shift of each metamaterial re-configurable element is limited. Thus, an advantage of such meta-material-based arrays is that quantizing the tuning of the phase of reflection coefficient of each re-configurable element to two values, e.g. 0° and 180° (or generally only a few values), only incurs limited losses that can be acceptable during operation. Then, bi-stable hardware elements—e.g., bi-stable MEMS mirrors, bi-stable switches or PIN diodes—can be used to implement the metamaterial re-configurable elements. When designing metamaterial re-configurable elements, the physical dimension of the re-configurable elements (e.g., side lengths) in general directly relates to the wave-length of electromagnetic waves that can be reflected. For THz communication, where reflectors may play a large role in extending the coverage and in mitigating shadowing, the metamaterial re-configurable elements may become critically small, with wavelengths on the order of 1 mm or less. Therefore, it is a challenge to integrate metamaterial re-configurable elements in an array where each unit cell only may have an area of 0.1×0.1 mm$^2$ or less (i.e. assuming multiple unit cells/square wavelength).

The RRD can also be implemented using an array comprising antennas, i.e., using an RAA. Here, each antenna is tuned to the carrier frequency and is redirecting the incoming electromagnetic waves. The respective outgoing electromagnetic waves exhibit a phase shift with respect to the incoming electromagnetic waves. This phase shift is typically directly associated with the intended propagation direction, i.e., depends on an outgoing angle of the outgoing beam. The spacing between the re-configurable antenna elements is typically half a wavelength or a quarter of a wavelength. If similar quantization is used on an antenna array as can be used for the meta material, the array gain will be heavily reduced, and relates to quantization loss: As the contribution to the reflected wave from each antenna re-configurable element is larger, also in turn the insertion loss from the active tuning component is larger, further decreasing the overall performance of the RRD. As will be described below, it is possible to mitigate such effects by increasing the illuminated area, i.e., increase the number of re-configurable elements within the effective optical aperture.

Various techniques are based on the finding that for high frequencies of the electromagnetic waves, the beam diameter of the incoming beam is typically small. The beam diameter denotes the 1-D or 2-D extension of the beam perpendicular to the propagation direction (as a general note, herein considerations are made for 1-D, but are generally applicable to 2-D); the beam diameter will also be discussed in connection with FIG. 5. Then, the full optical aperture (cf. FIG. 5) of the array of re-configurable elements may not be efficiently used (i.e., the effective optical aperture—defined by the illuminated area) may be as large as the optical aperture—defined by the maximum area of the array of re-configurable elements. Only a fraction of all available re-configurable elements of the array may be within the beam diameter of the incoming beam. Typically, it is helpful if the amount of re-configurable elements used for beam-forming with respect to the outgoing beam is comparably large. For instance, sidelobes can be suppressed, and a higher gain of the outgoing beam may be achievable. Further, the quantization error on the reflection coefficient of re-configurable elements will be reduced (i.e., as the achievable circuitry dimensions approach the wavelength). One solution is to consider spherical properties related to the focal distance when determining how to re-configure the re-configurable elements. However, such techniques greatly increase the complexity of the beamforming.

Another solution discussed in this document relates to using a beam-shaping unit that is arranged at an offset (i.e., at a distance) from the array of re-configurable elements upstream along a propagation direction of the incoming beam. The beam-shaping unit is configured to increase the beam diameter of the incoming beam.

By increasing the beam diameter, the "illuminated area" on the array of re-configurable elements is increased. In other words, the count of re-configurable elements of the array contributing to the beamforming is increased. The effective optical aperture of the reflective surface is increased.

Thereby, the outgoing beam can be provided at a higher gain due to reduced quantization errors. With a larger active area (i.e., more illuminated re-configurable elements), the contribution of each unit area will be reduced which may reduce the quantization effects. This applies to both antennas and meta-material re-configurable elements.

As a general rule, multiple options are available for implementing the beam-shaping unit. Two options are summarized below in TAB. 1.

TABLE 1

Multiple variants for a beam-shaping unit that is configured to increase the beam diameter of the incoming beam at least in one spatial dimension perpendicular to the propagation direction of the incoming beam.

| Variant | Description | Example details |
|---|---|---|
| I | Lens | For instance, a lens having a single optical axis and a well-defined focal lengths can be used. For instance, a spreading lens can be used that is configured to increase the beam divergence of the incoming electromagnetic waves, thereby widening the beam diameter of the incoming beam.<br>For example, a lens similar to Luneberger lens, but with spreading properties, may be used.<br>The lens can be arranged in front of the reflecting surface formed by the array of re-configurable elements.<br>For example, an offset between the lens and the reflecting |

TABLE 1-continued

Multiple variants for a beam-shaping unit that is configured to increase the beam diameter of the incoming beam at least in one spatial dimension perpendicular to the propagation direction of the incoming beam.

| Variant | Description | Example details |
|---|---|---|
|  |  | surface could be denoted as d. The focal length of the lens is denoted as f. The offset can be dimensioned as d > 2f. In the case of a Luneberger lens, spreading and flipping of rays of the incoming electromagnetic waves can be achieved. The effective optical aperture of reflecting surface can then be enlarged (until up to the optical aperture of the reflective surface) depending on the focal length of the lens and the offset between the lens and the reflecting surface. For example, the offset may be dimensioned so that the beam diameter is widened at least by a factor 2 (e.g., in 1-D or 2-D). For example, if the beam diameter is widened by a factor of 2 in both spatial directions perpendicular to the propagation direction of the incoming beam (lateral directions; x- and y-axis in the plots), then it is possible to illuminate a factor of 4 more re-configurable elements of the array forming the reflective surface. |
| II | Varying focal length | It is not required in all scenarios that a lens - having a well-defined optical axis and focal length - is used. In other examples, it would be possible that the beam-shaping unit is implemented having locally varying focal lengths, i.e., no macroscopically well-defined focal length. This could be thought of as multiple lenslets (i.e., small lens elements arranged in a well-defined relationship with each other) each having an individual focal length. The spatial behavior of the focal lengths perpendicular to the propagation direction of the incoming beam may follow a complex pattern, e.g., deviate from a linear behavior. Notwithstanding the varying focal lengths, the beam diameter may be increased on a macroscopic scale by such a beam-shaping unit. An advantage of such structures is that they may be easier to manufacture using, e.g., silicon-based wafer processing or 3D printing. Such beam-shaping units may have a simpler geometry compared to a lens according to variant I. |

As a general rule, various options are available for implementing the beam-shaping unit. For instance, the beam-shaping unit may be realized by a shaped dielectric or a meta-surface. It is possible to implement the beam-shaping unit as separate sheets, e.g., a multi-layer structure. Such an implementation can have a compact dimension and can be feasible for indoor and outdoor environments. For instance, the beam-shaping unit can include a laterally structured dielectric surface, i.e., a surface that has a dielectric pattern perpendicular to a propagation direction of the incoming beam. Optionally, a meta-material array of multiple beam-shaping elements can be implemented. It would be possible that the beam-shaping unit includes multiple sheets that are stacked along the propagation direction of the incoming beam, each sheet including one or more beam-shaping elements. For instance, it would be possible to fabricate the beam-shaping unit using lithography of a semiconductor wafer. Metallic layers can be deposited. It would be possible to use 3-D printing techniques, e.g., laser sintering.

FIG. 1 schematically illustrates a communication system 100. The communication system includes two nodes 101, 102 that are configured to communicate with each other via a data carrier 111. For instance, the data carrier 111 may have a carrier frequency of not less than 20 GHz or even not less than 40 GHz. THz frequencies, e.g., no less than 500 GHz, are conceivable. It would also be possible to use sub-6 GHz frequencies. The data carrier 111 may be implemented along a spatial propagation channel that is implemented via an RRD (not illustrated in FIG. 1) and that is configured to provide multiple spatial filters for electromagnetic waves having such frequencies, e.g., of not less than 20 GHz or optionally of not less than 500 GHz. Re-configurable elements of the RRD are then dimensioned accordingly, i.e., scale with the wavelength of the frequencies of the electromagnetic waves.

In the example of FIG. 1, the node 101 is implemented by an access node, more specifically a BS, and the node 102 is implemented by a UE. The BS 101 can be part of a cellular network (not shown in FIG. 1) or another communications network (NW).

As a general rule, the techniques described herein could be used for various types of communication systems, e.g., also for peer-to-peer communication, etc. For the sake of simplicity, however, hereinafter, various techniques will be described in the context of a communication system that is implemented by a BS 101 of a cellular NW and a UE 102.

As illustrated in FIG. 1, there can be downlink (DL) communication, as well as uplink (UL) communication. The communication system 100 can exhibit reciprocity for UL and DL.

Figure 2:
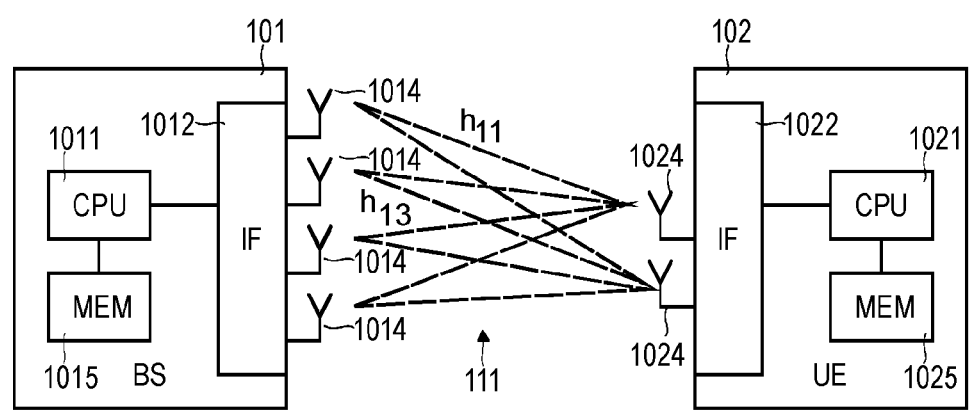
FIG. 2 schematically illustrates details of the communication system of FIG. 1.

FIG. 2 illustrates details with respect to the BS 101. The BS 101 implements an access node to a communications network, e.g., a 3GPP-specified cellular network. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.:

controlling an RRD; transmitting signals towards an RRD; receiving signals from an RRD; beamforming; etc.

FIG. 2 also illustrates details with respect to the UE 102. The UE 102 includes control circuitry that is implemented by a processor 1021 and a non-volatile memory 1025. The processor 1021 can load program code that is stored in the memory 1025. The processor can execute the program code. Executing the program code causes the processor to perform techniques as described herein, e.g.: controlling an RRD; transmitting signals towards an RRD; receiving signals from an RRD; beamforming; etc.

FIG. 2 also illustrates details with respect to communication between the BS 101 and the UE 102 on the data carrier 111. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the BS.

The interfaces 1012, 1022 can each include one or more TX chains and one or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 1014, 1024. Thereby, the BS 101 and the UE 102 can selectively transmit on multiple TX beams (beamforming), to thereby direct energy into distinct spatial directions. Different spatial propagation channel can be addressed.

By using a TX beam, the direction of the wavefront of electromagnetic waves transmitted by a transmitter of the communication system is controlled. Energy is focused into a respective direction or even multiple directions, by phase-coherent superposition of the individual signals originating from each antenna 1014, 1024. Thereby, the spatial data stream can be directed. The spatial data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

Figure 3:
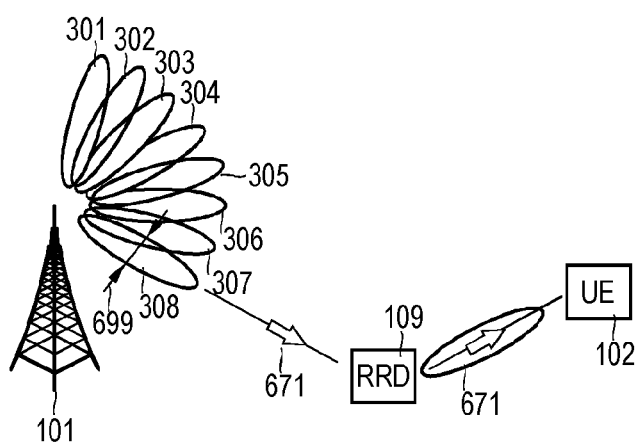
FIG. 3 schematically illustrates an RRD included in a propagation channel between two nodes of the communication system.

FIG. 3 illustrates aspects with respect to beamforming at the BS 101. The BS 101 can use multiple beams 301-308— e.g., TX beams and/or RX beams—to communicate with the UE 102. The UE 102 is served by the beam 308, via an RRD 109.

FIG. 3 also illustrates a beam width 699 of the beam 308. The beam width 699 defines an angle into which electromagnetic waves of a certain amplitude are emitted or an angle from which electromagnetic waves are accepted at a certain insertion loss. For transmit beams, the beam width 699 impacts a beam diameter at which the electromagnetic waves arrive at a receiver. The beam diameter is discussed in connection with FIG. 5.

While FIG. 3 illustrates a scenario of DL communication, the various techniques described herein are likewise applicable to UL communication or sidelink communication.

Figure 4:
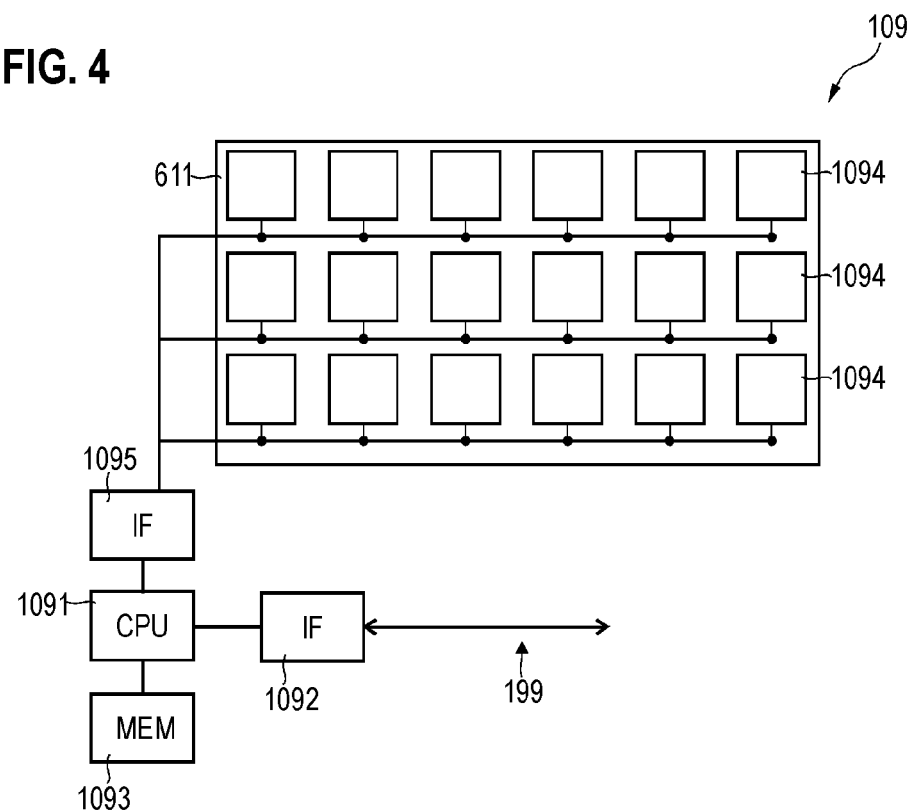
FIG. 4 schematically illustrates details with respect to the RRD.

FIG. 4 illustrates aspects in connection with the RRD 109. The RRD 109 could be implemented by an LIS or a smart repeater. The RRD 109 includes an array of reconfigurable elements 1094—e.g., antennas or meta-material unit cells— that impose a configurable phase shift when reflecting incident electromagnetic waves. This array of re-configurable elements 1094 forms a reflective surface 611. Typically, antennas can impose gradually varying phase shifts; while meta-material unit cells may, in some examples, be configured to provide only a set of phase shifts with a higher degree of quantization when compared to antennas, e.g., two phase shifts such as +90° or −90° or 0° and +180° ("1 bit setting").

Each re-configurable element 1094 can locally provide a respective phase shift. i.e., each re-configurable element 1094 may be individually configured.

This defines respective spatial filters that are associated with spatial directions into which incoming electromagnetic waves are reflected. i.e., on a macroscopic level, this defines the spatial direction into which an outgoing beam is reflected.

The RRD 109 thus provides coverage extension by reflection of radio-frequency (RF) signals. Another example includes amplification of RF signals. In any case, a translation to the baseband may not be required. This is different, to, e.g., decode-and-forward repeater or relay functionality. In particular, a latency associated with the operation of the RRD 109 may be significantly smaller than the latency of a decode-and-forward repeater. In particular, the latency introduced by the operation of the RRD 109 may be shorter than a typical symbol duration of symbols—e.g. OFDM symbols—communicated between the nodes or even shorter than a cyclic prefix length of an OFDM symbol. Then, the symbols can be decoded without considering the presence or absence of the RRD 109 when re-synchronizing.

The RRD 109 includes an antenna interface 1095 and a processor 1091 that can activate respective spatial filters one after another, e.g., in accordance with a re-configuration timing that defines the dwell time per spatial filter.

Further, there is a communication interface 1092 such that communication on an auxiliary carrier 199 can be established between the RRD 109 and, e.g., the BS 101 and/or the UE 102. Example implementations of the auxiliary carrier 199 include, e.g., a WiFi protocol or a Bluetooth protocol. A wired connection would be possible. A control link with, e.g., the BS 101 and/or the UE 102 can be established on the auxiliary carrier 199.

For instance, RSs for the purpose of a beam management procedure at the RRD 109 may be communicated on the auxiliary carrier 199. For instance, the UE 102 may transmit RSs to the RRD 109. For example, it would be possible to perform angle-of-arrival measurements or other positioning techniques (e.g., path loss, and/or angle-of-departure, etc.) based on such RSs communicated on the auxiliary carrier 199 as part of the beam management procedure. Thereby, the relative positioning of the RRD with respect to the UE 102 can be probed and, accordingly, it is possible to select appropriately aligned TX and/or RX beams at the RRD 109 for communication on the data carrier 111. Such techniques assume that the spatial propagation channel of signals communicated on the auxiliary carrier 199 will not significantly deviate from the spatial propagation channel of signals communicated on the data carrier 111.

It would be possible that control data is communicated that is indicative of the beam management procedure at the RRD 109.

As will be appreciated from the above, the auxiliary carrier 199 can be used to assist the beam management procedure at the RRD 109.

The processor 1091 can load program code from a non-volatile memory 1093 and execute the program code. Executing the program code causes the processor to perform techniques as described herein, e.g.: re-configure each one of the re-configurable elements 1094 to provide a selected one of multiple spatial filters; determine a configuration of each one of the re-configurable elements 1094; selecting a spatial filter and/or re-configuring based on an incident angle of the incoming beam, an outgoing angle of the outgoing beam, and a predefined beam-shaping coefficient associated with a beam-shaping unit.

Figure 5:
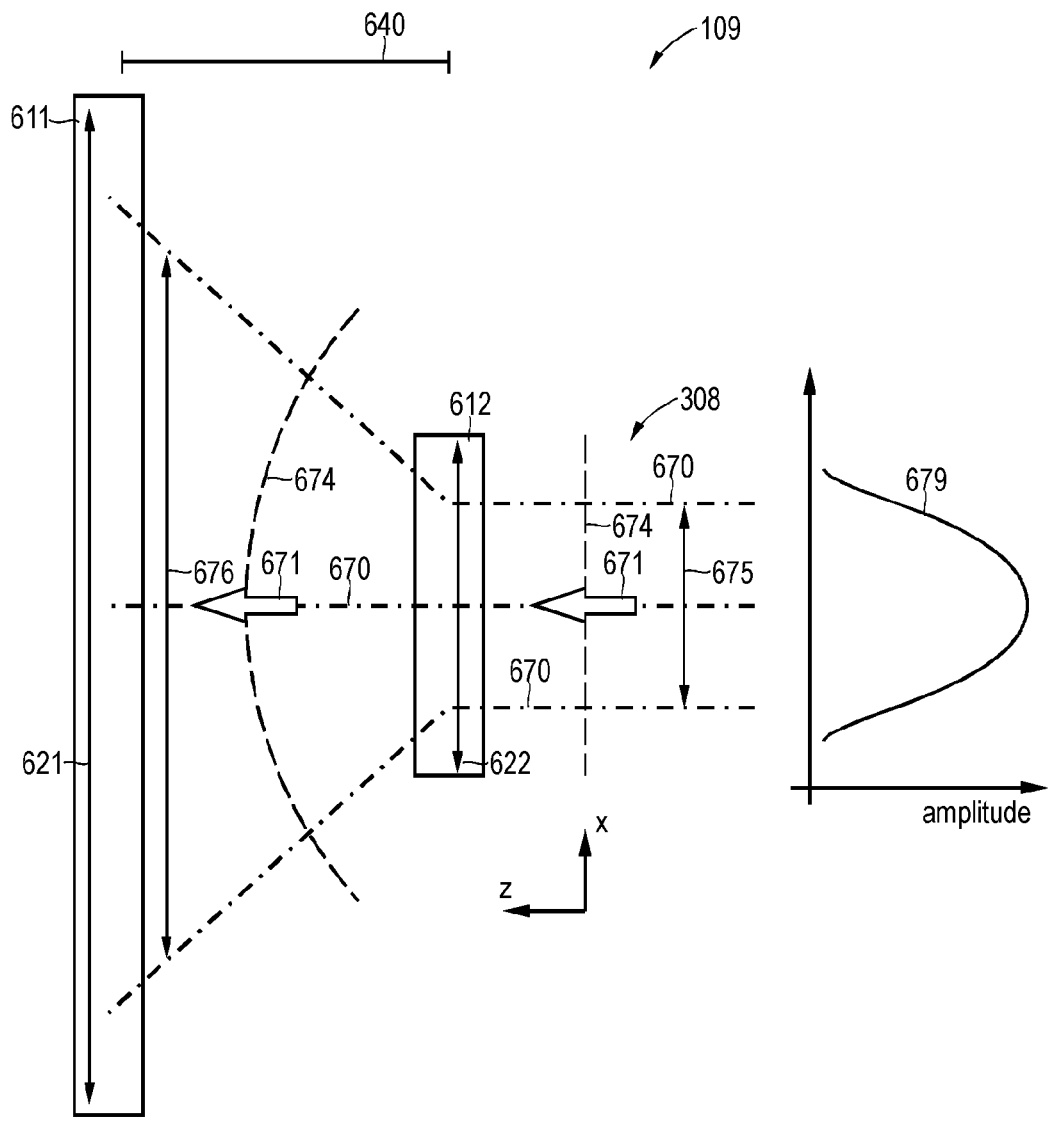
FIG. 5 schematically illustrates a reflective surface and a beam-shaping unit of the RRD according to various examples, and in particular illustrates ray tracing of incoming electromagnetic waves of an incoming beam.

FIG. 5 schematically illustrates aspects with respect to the RRD 109. FIG. 5 is a schematic side view of the RRD 109. FIG. 5 illustrates the reflective surface 611 (the reconfigurable elements 1094 are omitted from view in FIG. 5, for sake of simplicity). FIG. 5 illustrates an incoming beam, here as an example the beam 308 (cf. FIG. 3). The beam 308 has a certain beam diameter 675 (width of the light field) that is defined by the spatial amplitude distribution 679 of the electromagnetic waves of the incoming beam 308 (cf. inset of FIG. 5, at the right side).

FIG. 5 illustrates that a beam-shaping unit 612 is arranged at an offset 640 from the reflective surface 611, i.e., from the array of re-configurable elements 1094, upstream along a propagation direction 671 of the incoming beam 308 (the propagation direction 671 defines the z-axis; while in the example of FIG. 5, the z-axis is perpendicular to the reflective surface 611, the z-axis could generally enclose an arbitrary angle with the reflective surface 611).

FIG. 5 includes ray traces of incoming electromagnetic waves 670 of the incoming beam 308 (dotted-dashed lines). As illustrated in FIG. 5, the beam-shaping unit 612 is implementing a spreading lens, i.e., increasing a beam divergence of the incoming electromagnetic waves 670 (the inter-ray distance increases downstream of the beam-shaping unit 612). Accordingly, the beam diameter 676 of the incoming beam 308 close to the reflective surface 611 downstream of the beam-shaping unit 612 is larger than the beam diameter 675 of the incoming beam 308 upstream of the beam-shaping unit 612.

FIG. 5 also illustrates isolines of a wavefront 674 of constant phase of the electromagnetic waves; while upstream of the beam-shaping unit 612, there is a plane wavefront, downstream of the beam-shaping unit 612, a non-planar wavefront 674—e.g., a spherical wavefront—is encountered.

FIG. 5 illustrates that the optical aperture 622 of the beam-shaping unit 612 is significantly smaller than the optical aperture 621 of the reflective surface 611. The optical aperture of an optical element generally denotes the area of the optical element for which a predefined optical effect can be imposed on incoming electromagnetic waves. For instance, the optical aperture of a pinhole is the size of the hole; the optical aperture of a lens is defined as the lateral extensions of the lens for which electromagnetic waves are affected with respect to a defined optical axis and focal length. For example, where the optical aperture is smaller than the beam diameter, light not impinging into the optical aperture is typically lost. As a general rule, the optical aperture 622 may not be larger than 50% of the optical aperture 621 of the reflective surface 611. This is because, typically, the beam diameter 675 of the incoming beam 308 upstream of the beam-shaping unit 612 will be significantly smaller than the optical aperture 621 of the reflective surface 611.

As illustrated in FIG. 5, the offset 640 is dimensioned so that the beam diameter 676 close to or at the reflective surface 611 is larger by, at least, a factor of 2 if compared to the beam diameter 675 upstream of the beam-shaping unit 612. For example, the offset 640 can also depend on the focal length of the beam-shaping unit 612.

The effect of such a configuration is also illustrated in connection with FIG. 6 and FIG. 7.

Figure 6:
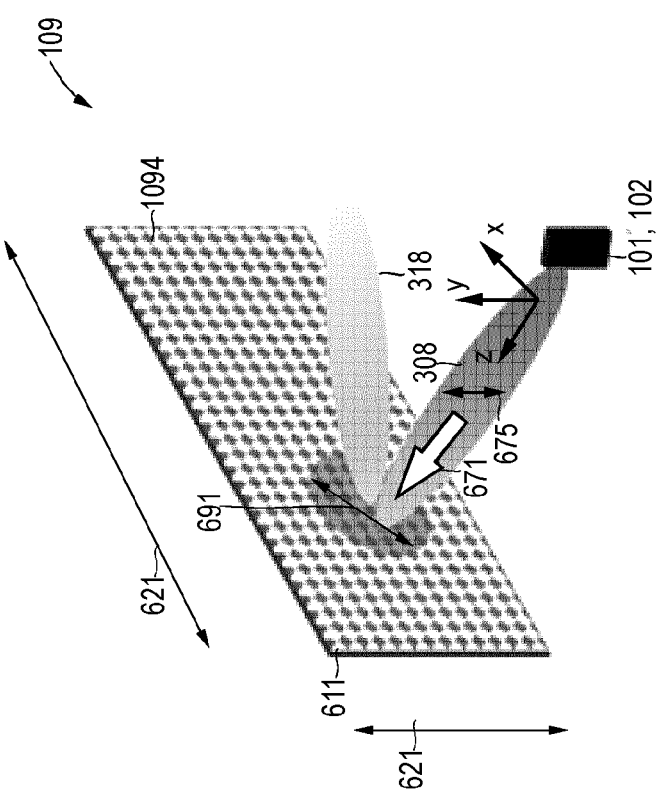
FIG. 6 is a perspective view of a conventional RRD without a beam-shaping unit.

FIG. 6 is a perspective view of the RRD 109 not employing a beam-shaping unit upstream along the propagation direction 671 of the incoming beam 308. Accordingly, an illuminated area 691 of the reflective surface 611 has lateral dimensions (in the x-y-plane) that are comparably small, because of the limited beam diameter 675. Thus, the illuminated area 691 is significantly smaller than the optical aperture 621 of the array of re-configurable devices 194, i.e., the reflective surface 611.

Figure 7:
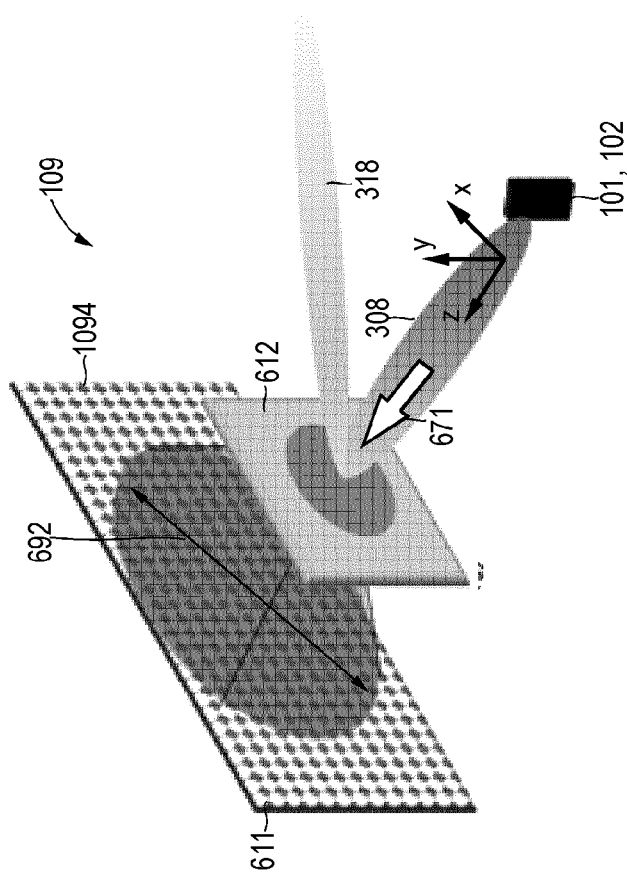
FIG. 7 is a perspective view of an RRD including a beam-shaping unit according to various examples.

By increasing the beam diameter of the incoming beam 308, a larger illuminated area 692 (i.e., having larger dimensions in the x-y-plane) is obtained, cf. FIG. 7. In the scenario of FIG. 7, a larger count of re-configurable elements 194 contributes to applying the spatial filter to the incoming beam 308. This can help to reduce quantization effects negatively affecting an outgoing beam 318. A narrower beam diameter can be obtained for the outgoing beam 318. Sidelobes of the outgoing beam 318 can be suppressed, i.e., the gain on the main lobe is higher. Details with respect to the outgoing beam 318 is also illustrated in connection with FIG. 8.

Figure 8:
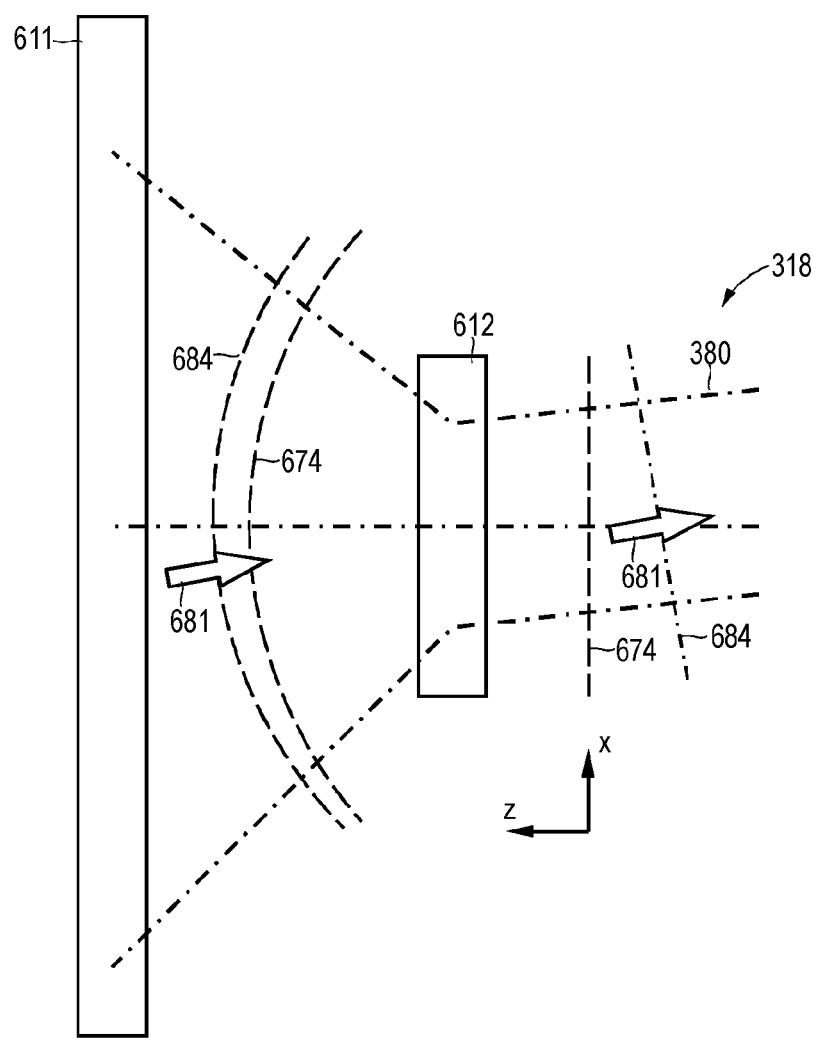
FIG. 8 schematically illustrates a reflective surface and a beam-shaping unit of the RRD according to various examples, and in particular illustrates ray tracing of outgoing electromagnetic waves of an outgoing beam.

FIG. 8 illustrates aspects with respect to the outgoing beam 318. The outgoing beam 318 has a propagation direction 681 that encloses an angle with the z-axis, i.e., is inclined with respect to the propagation direction 671 of the incoming beam 308 (also the spherical wavefront 684 of the outgoing beam 318 is rotated with respect to the wavefront 674). The alignment of the propagation direction 681 is defined by a selected one of multiple spatial filters.

In the scenario FIG. 8, the array of re-configurable elements, i.e., the reflective surface 611, is configured to reflect (and optionally amplify) outgoing electromagnetic waves 380 of the outgoing beam 318 towards the beam-shaping unit 612. Such refection towards the beam-shaping unit 612 is generally optional; in other scenarios, the reflection may be away from the beam-shaping unit 612. Accordingly, in the scenario of FIG. 8, the outgoing beam 318 runs through the beam-shaping unit 612. Thus, there is an impact of the beam-shaping unit 612 onto the outgoing electromagnetic waves 380. According to various examples, it is possible to account for such impact of the beam-shaping unit 612 onto the outgoing electromagnetic waves when re-configuring the re-configurable elements 1094 to provide a selected one of multiple spatial filters, e.g., as part of a respectively defined beam-shaping coefficient.

Details with respect to such re-configuring of the re-configurable elements 1094 are illustrated in connection with FIG. 9.

Figure 9:
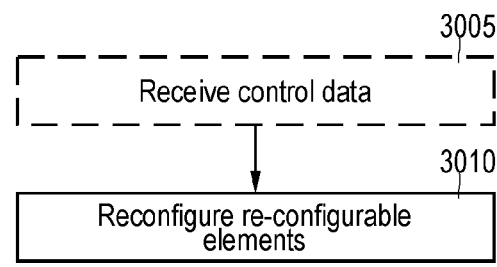
FIG. 9 is a flowchart of a method according to various examples.

FIG. 9 is a flowchart of a method according to various examples. Optional boxes are labeled with dashed lines in FIG. 9. For example, the method of FIG. 9 could be executed by an RRD such as the RRD 109. More specifically, it would be possible that the method of FIG. 9 is executed by the processor 1091 of the RRD 109.

At optional box 3005, control data is received. For instance, the control data could be received from a BS 101 or a UE 102, e.g., via a respective control link (cf. FIG. 4: control link on an auxiliary carrier 199). The control data could be indicative of information that is associated with, e.g., a relative positioning of the RRD with respect to a transmitter node and/or a receiver node such as the base station or the UE. The control data could include information that enables the RRD to select an appropriate spatial filter.

Next, at box 3010, the RRD re-configures each one of its re-configurable elements to provide a selected one of multiple spatial filters.

For instance, it would be conceivable that the setting of each one of the re-configurable elements is calculated at box 3010. It would also be possible to use a lookup table or a machine-learning algorithm to determine the setting of each one of the re-configurable elements.

Such re-configuring can be generally based on an incident angle of the incoming beam and/or an outgoing angle of the outgoing beam. i.e., for different incident angles and/or outgoing angles, different settings may be selected for the various re-configurable elements. The incident angle and the outgoing angle may be defined with respect to the surface normal of the reflective surface 611 (cf. FIG. 5 and FIG. 8).

Such re-configuration of the re-configurable elements at box 3010 can also depend on a predefined beam-shaping coefficient associated with the beam-shaping unit. For instance, an impact of the beam-shaping unit on incoming electromagnetic waves of the incoming beam can be considered. Optionally, it would be possible to consider an impact of the beam-shaping unit on outgoing electromagnetic waves of the outgoing beam, in particular, if the outgoing beam also traverses the beam-shaping unit (cf. FIG. 7 and FIG. 8).

As a general rule, there are various options available for implementing the beam-shaping coefficient. For example, the spherical wavefront (cf. FIG. 5 and FIG. 8) effected by the beam-shaping unit 612—as opposed to a plane wavefront—may be considered by the beam-shaping coefficient. For example, a machine-learned algorithm could be used. The machine-learned algorithm can accept, as an input, at least one of the incident angle (angle-of-arrival) or the outgoing angle (angle-of-departure) and then output, for each re-configurable element a respective setting. Such a scenario may be, in particular, helpful if the beam-shaping unit is not implemented as a lens, i.e., has varying focal lengths. Then, it may be helpful to consider for complex dependencies between the re-configuration of each re-configurable element and the incoming beam and/or the outgoing beam. In another scenario, in particular where the beam-shaping unit implements a lens, a microscopic lens formula that specifies distances are respectively formed images depending on the focal length and/or a divergence of the electromagnetic waves/ray traces can be considered. It would be possible to consider aberration properties of such beam-shaping units, i.e., deviations from an ideal spreading lens.

In particular, in such scenarios, it may not be required to compensate for quantization effects. Accordingly, it would be possible that the re-configurable elements are re-configured irrespective of (without depending on) a propagation distance of the incoming beam or the outgoing beam, i.e., a distance along the propagation path of the incoming beam or the outgoing beam in between the re-configurable device and a respective transmitter node or receiver node, respectively. In other words, due to the decreased effective aperture of the RRD in presence of the beam-shaping unit, the electromagnetic waves may not be treated as residing in the near-field regime; but rather as residing in the far-field regime. In particular, the incoming electromagnetic waves are considered to exhibit near-field behavior, if the wavefront is not planar. The near-field regime is defined by the effective aperture of the RRD and the wavelength of the electromagnetic waves. For higher frequencies, even for larger distances to the transmitter, the incoming electromagnetic waves are in the near-field regime. Then, the non-planer wavefront needs to be considered when re-configuring the RRD. The curvature depends on the distance between the transmitter (for incoming electromagnetic waves) and/or receiver (for outgoing electromagnetic waves) to the RRD. When the distance is larger, i.e. in the far-field, the wavefront is practically planar, and the beam steering becomes independent of the distance. Hence, only angle-of-arrival needs to be considered. A similar effect can be achieved using the techniques described herein, by increasing the effective aperture of the RRD.

Summarizing, techniques have been described that facilitate designing and implementing an RRD including a beam-shaping unit configured to widen a beam diameter of an incoming beam. Thereby, the effectively used optical aperture of an array of re-configurable elements of the RRD can be effectively enlarged.

The proposed method is especially suited for very high frequencies, such as THz frequencies. Here, due to the reduced effective aperture of the antenna system, the far-field is closer and the precoder of the reflector (i.e., the determining of the setting of each re-configurable element) becomes simplified, i.e. only direction needs to be considered and not distance (far-field approximation). Such techniques are based on the finding that oftentimes, due to technological limitations, re-configurable elements cannot be packed as densely as required. Thus, by widening of the incoming beam, nonetheless a large count of re-configurable elements can be arranged within the effective aperture. This mitigates the need to design a codebook for spherical wavefronts, i.e., having the distance to BS/UE as a parameter for selecting a codeword.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

The invention claimed is:

1. A re-configurable repeater device re-configurable to provide multiple spatial filters, each one of the multiple spatial filters being applied to an incoming beam, to thereby obtain an outgoing beam, wherein the re-configurable repeater device comprises:
   an array of re-configurable elements, wherein the re-configurable elements of the array of re-configurable elements are configured to impose a respective phase shift onto outgoing electromagnetic waves of the outgoing beam with respect to incoming electromagnetic waves of the incoming beam, and
   a beam-shaping unit arranged at an offset from the array of re-configurable elements upstream along a propagation direction of the incoming beam and configured to increase a beam diameter of the incoming beam.

2. The re-configurable repeater device of claim 1, wherein the beam-shaping unit is a spreading lens configured to provide beam-shaping at a fixed focal length across its lateral dimension, by increasing a beam divergence of the incoming electromagnetic waves.

3. The re-configurable repeater device of claim 1, wherein the beam-shaping unit provides beam-shaping at varying focal lengths across its width direction.

4. The re-configurable repeater device of claim 1, further comprising:
   a control unit configured to re-configure each one of the re-configurable elements to provide a selected one of the multiple spatial filters, said re-configuring of each one of the re-configurable elements being based on an incident angle of the incoming beam, an outgoing angle of the outgoing beam, and a predefined beam-shaping coefficient associated with the beam-shaping unit.

5. The re-configurable repeater device of claim 4, wherein the pre-defined beam-shaping coefficient is implemented using a machine-learned algorithm, the machine-learned algorithm accepting, as an input, at least one of the incident angle or the outgoing angle.

6. The re-configurable repeater device of claim 4, wherein the control unit is configured to re-configure the re-configurable elements independent of a propagation distance of at least one of the incoming beam or the outgoing beam.

7. The re-configurable repeater device of claim 1, wherein the offset between the array of re-configurable elements and the beam-shaping unit is dimensioned so that the beam diameter of the incoming beam is widened at least by a factor of 2.

8. The re-configurable repeater device of claim 1, wherein the array of re-configurable elements is configured to reflect and optionally amplify the outgoing electromagnetic waves of the outgoing beam towards the beam-shaping unit.

9. The re-configurable repeater device of claim 1, wherein the array of re-configurable elements is configured to reflect and optionally amplify the outgoing electromagnetic waves away from the beam shaping unit.

10. The re-configurable repeater device of claim 1, wherein an optical aperture of the beam-shaping unit is not larger than 50% of an optical aperture of the array of re-configurable elements.

11. The re-configurable repeater device of claim 1, wherein the beam-shaping unit comprises a laterally structured dielectric surface, optionally a metamaterial array of multiple beam-shaping elements.

12. The re-configurable repeater device of claim 1, wherein the beam-shaping unit comprises multiple sheets stacked along the propagation direction of the incoming beam, each sheet comprising one or more beam-elements.

13. The re-configurable repeater device of claim 1, wherein the re-configurable repeater device is configured to provide the multiple spatial filters for the incoming electromagnetic waves and the outgoing electromagnetic waves having frequencies of not less than 20 GHz or optionally not less than 500 GHz.

* * * * *